Sept. 24, 1963 V. NEWMAN 3,104,633
SHIRRED FABRIC AND APPARATUS FOR PRODUCING SAME
Filed Aug. 24, 1960 5 Sheets-Sheet 1
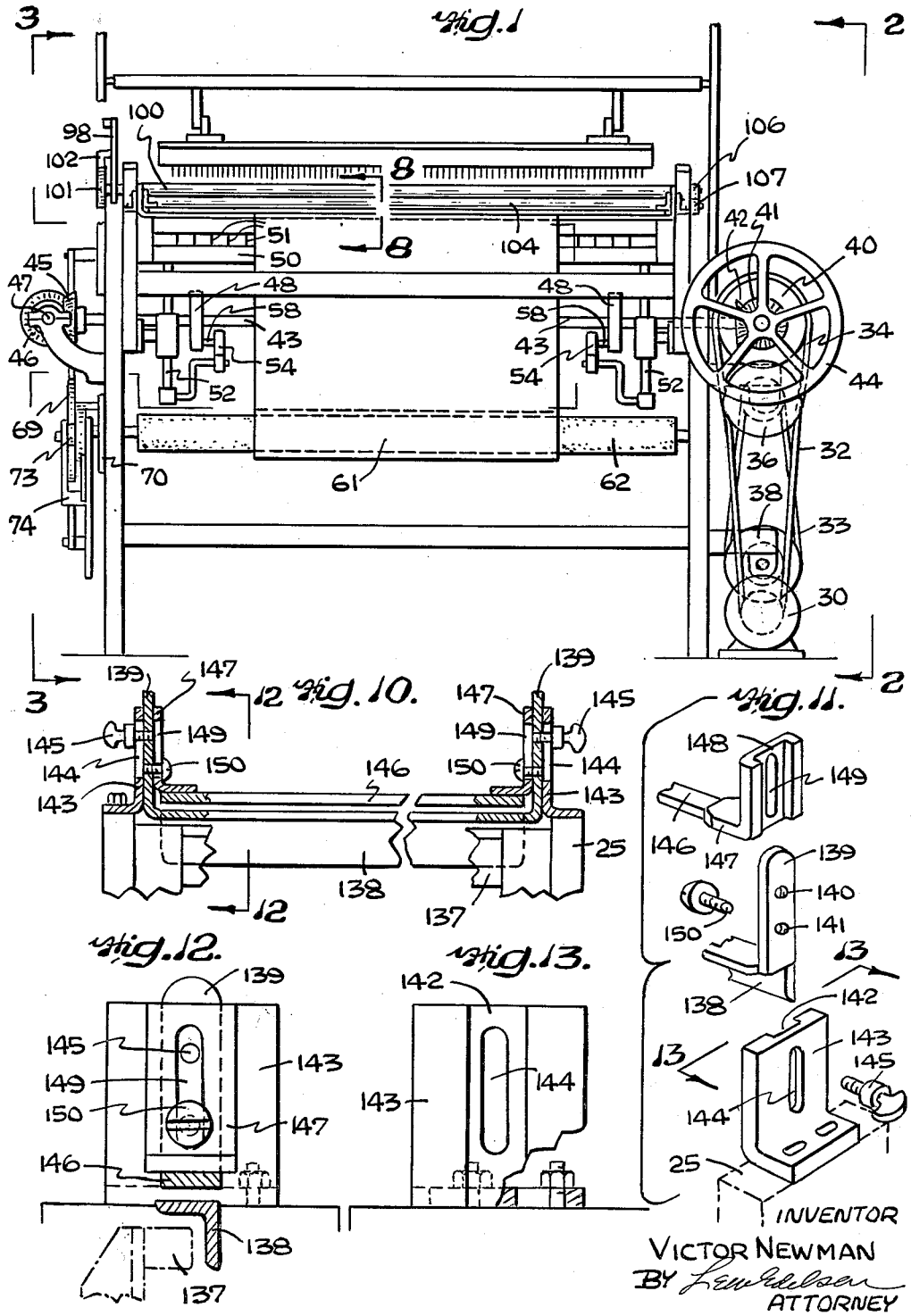
INVENTOR
VICTOR NEWMAN
BY *[signature]*
ATTORNEY

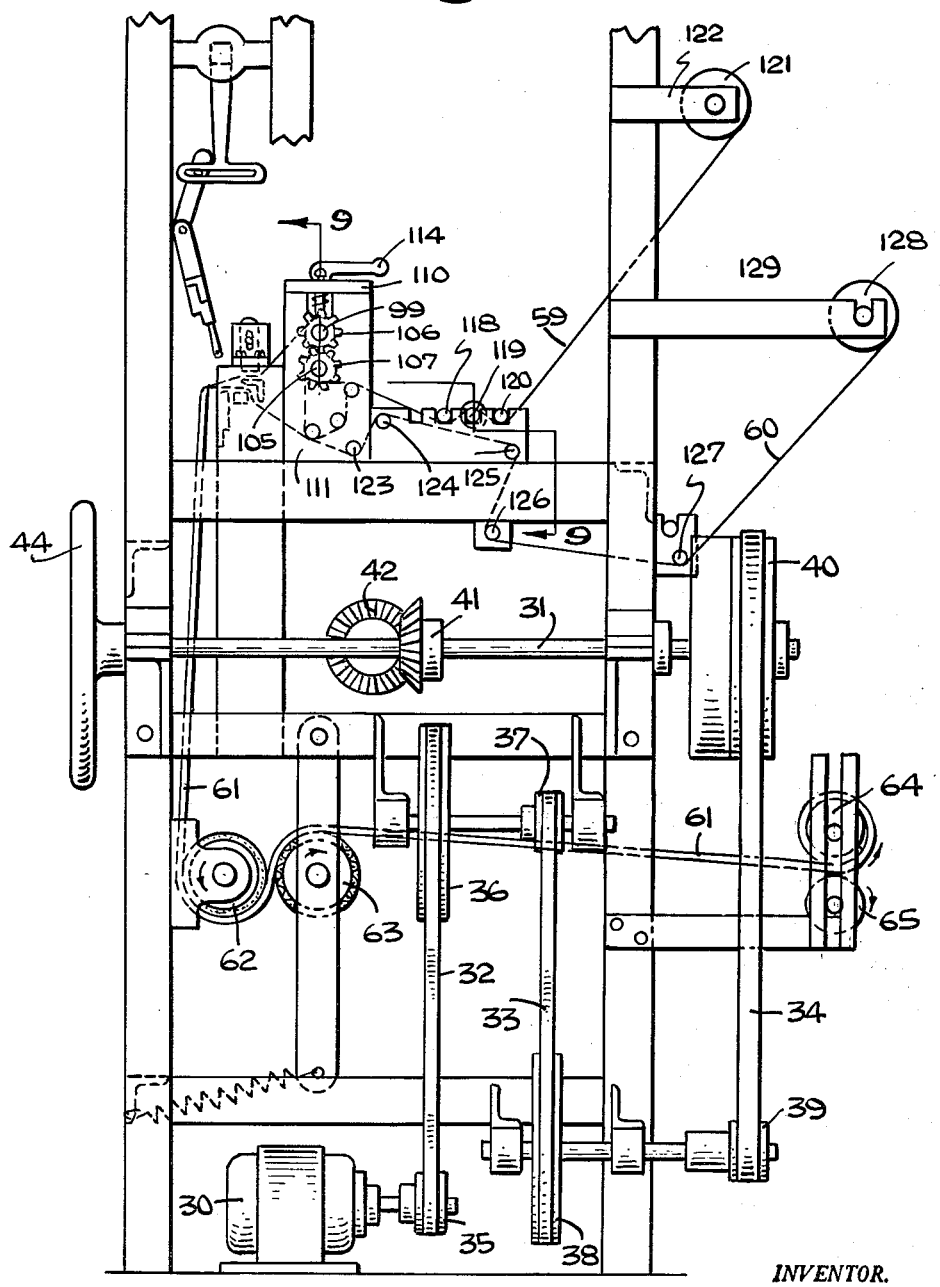

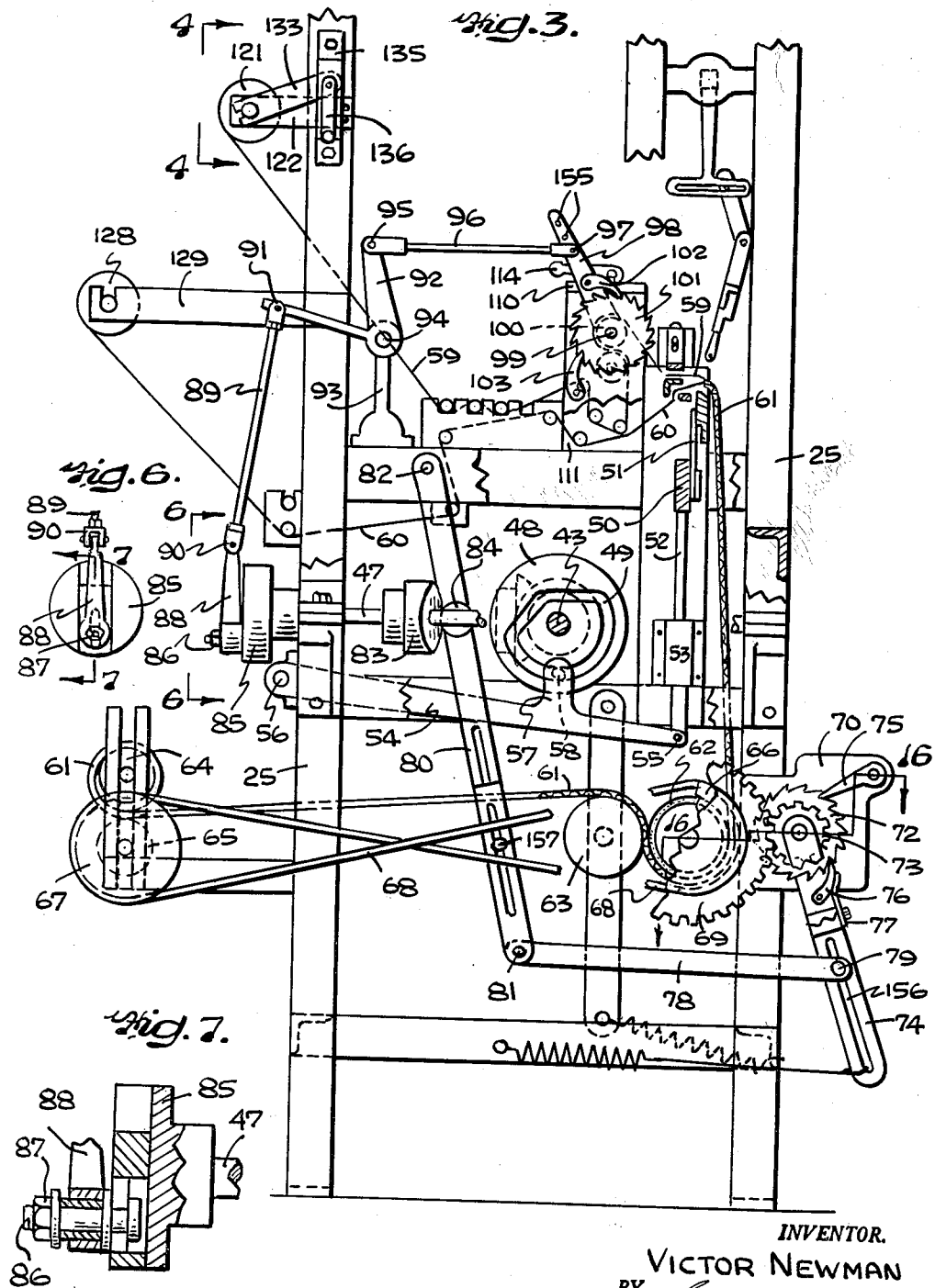

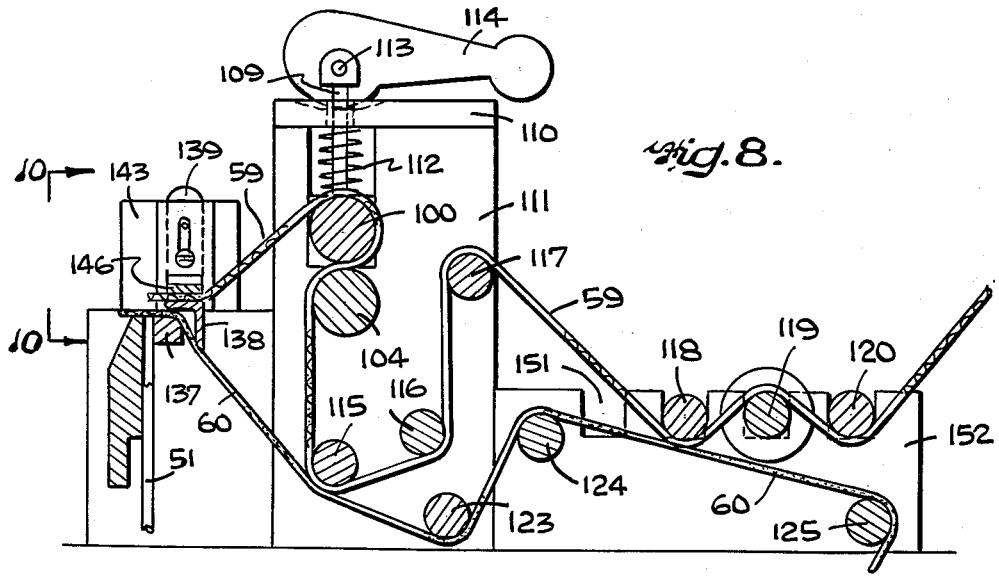
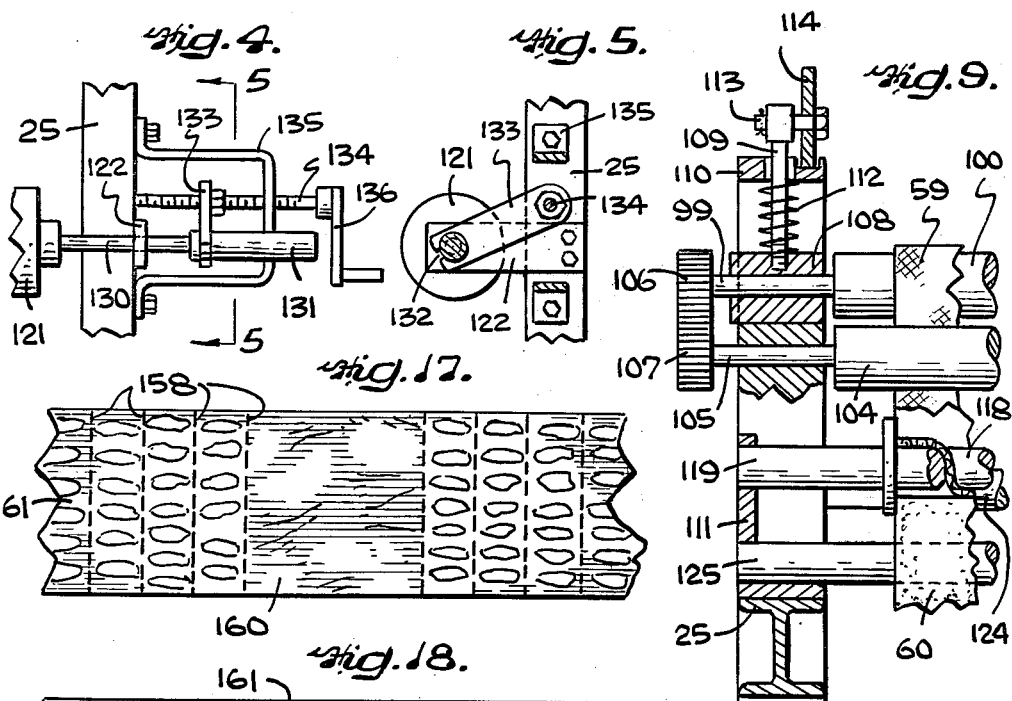
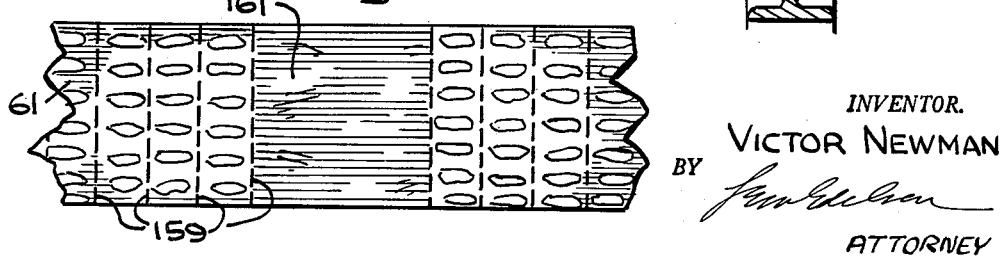

Sept. 24, 1963
V. NEWMAN
3,104,633
SHIRRED FABRIC AND APPARATUS FOR PRODUCING SAME
Filed Aug. 24, 1960
5 Sheets-Sheet 5
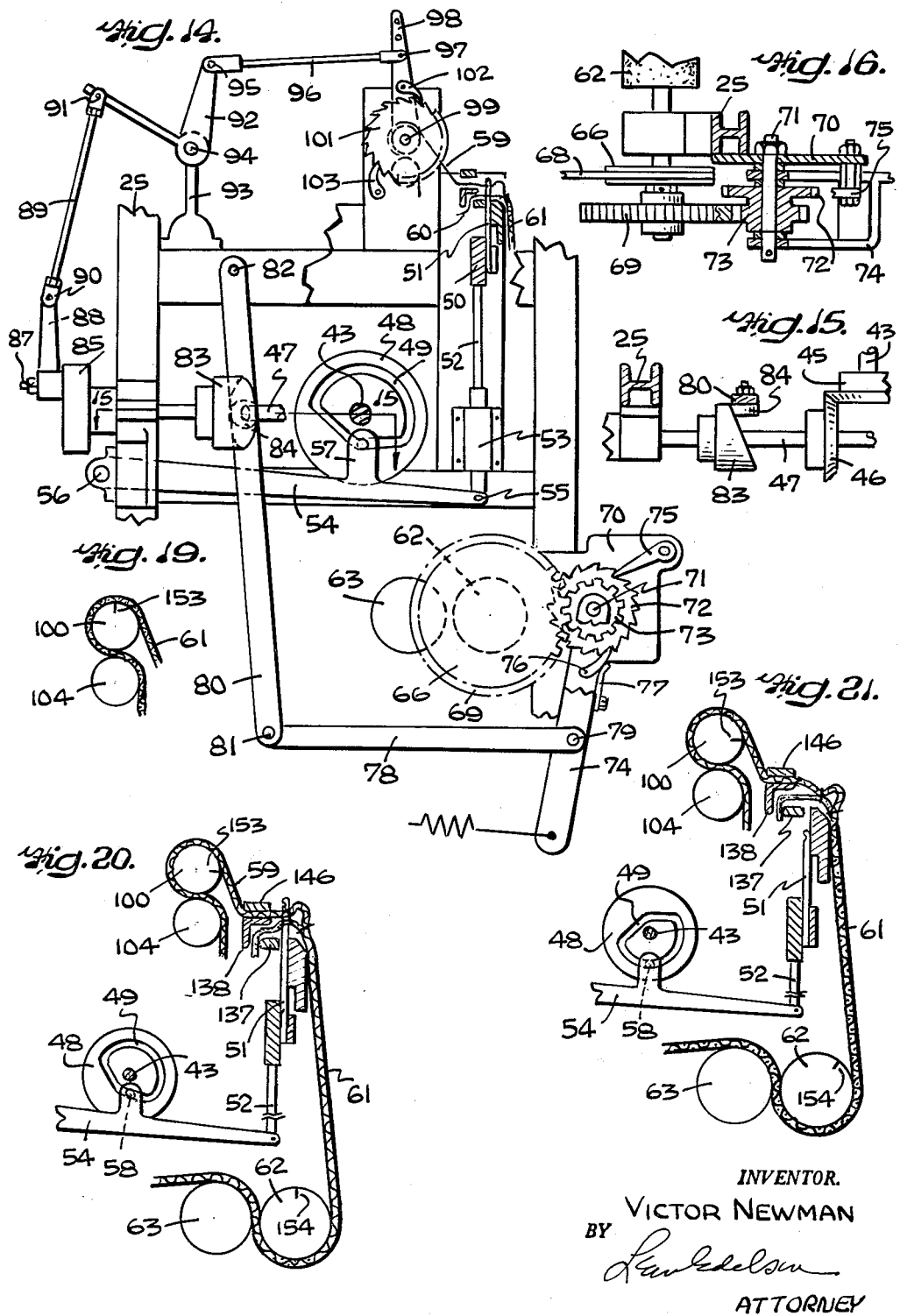
INVENTOR.
VICTOR NEWMAN
BY
ATTORNEY

United States Patent Office 3,104,633
Patented Sept. 24, 1963

3,104,633
SHIRRED FABRIC AND APPARATUS FOR
PRODUCING SAME
Victor Newman, 1526 Widener Place, Philadelphia, Pa.
Filed Aug. 24, 1960, Ser. No. 51,650
5 Claims. (Cl. 112—2)

This invention relates generally to shirred fabrics and to apparatus for automatically producing such a fabric. More particularly, this invention relates to a shirred fabric which may be made in continuous lengths upon a knitting machine type of apparatus by means of the incorporation thereinto of special structure which provides the machine with the ability to shirr the fabric being drawn therethrough. The shirring may be accomplished on a single ply of fabric, on multiple plies of fabric, or two plies of fabric may be sewn together in such a manner that one of the plies is shirred while the other ply is not shirred but remains in a flat planar sheet.

A two ply fabric having one of the plies shirred and the other ply, or backing, unshirred results in a composite shirred fabric wherein the backing ply prevents the shirring from pulling out and maintains the finished shirred fabric in its desired shape. The apparatus according to the invention provides for the backing ply to be applied to the shirred ply either as a full-wdith sheet or in strips of any desired width, the shirring of the top ply and the securing thereof to the backing ply being carried out simultaneously in a single operation. Additionally, the apparatus according to the invention permits shirring of variable depth to be carried out as desired within a wide range. Woven and non-woven fabrics, as well as pressed fiber sheet material and plastic film are equally well handled by the apparatus without regard to which of the foregoing materials is the ply to be shirred and which is to constitute the backing ply, if any.

The apparatus according to the invention by means of which the novel shirred fabric may be produced will be illustrated and described as incorporated into a flat upright type of knitting machine since the structure of such knitting machines is generally well known and will thus require a minimum of description, although, it is to be understood that the shirring apparatus itself could equally well be incorporated into any kind of structure capable of imparting the necessary motions to the fabric to be shirred and the apparatus for carrying out the stitching operations. Accordingly, it is a primary object of this invention to provide novel apparatus for producing a shirred fabric automatically and in continuous lengths, and to, therefore, produce shirred fabrics more economically than have heretofore been possible by eliminating the necessity for shirring fabrics by hand.

Another object of this invention is to provide novel apparatus for producing shirred fabrics which simultaneously carries out the operations of shirring one ply of fabric and stitching the shirred ply to an unshirred backing ply resulting in a stronger and a more permanently shirred fabric.

Yet another object of this invention is to provide novel apparatus for producing shirred fabric which permits selective control within wide limits of the depth of shirring carried out.

Still another object of this invention is to provide a novel shirred fabric which consists of two plies of material, one of which is shirred and the other of which is unshirred, the two plies of material being stitched together to provide a stronger, more attractive and durable shirred fabric.

The foregoing and other objects of the invention will become apparent from a reading of the following specification in conjunction with an examination of the appended drawings, wherein:

FIGURE 1 is a front elevational view of one form of the apparatus according to the invention for producing the novel shirred fabric and provides a gross picture of the total apparatus;

FIGURE 2 is an enlarged side view, illustrating in greater detail, the apparatus of FIGURE 1 as would be seen when viewed along the lines 2—2 thereof;

FIGURE 3 is an end view of the apparatus of FIGURE 1 as would be seen when viewed along the lines 3—3 thereof with portions of the structure fragmented away to reveal details which would otherwise be obscured;

FIGURE 4 is an enlarged fragmentary view of the position adjusting mechanism associated with one of the fabric supply rolls as would be seen when viewed along the lines 4—4 of FIGURE 3;

FIGURE 5 is a fragmented sectional view through the roller adjusting mechanism illustrated in FIGURE 4 as would be seen when viewed along the lines 5—5 of that figure;

FIGURE 6 is a detailed view of the eccentric crank arm which drives the portion of the total apparatus effective to bunch the fabric to be shirred prior to stitching thereof and as would be seen when viewed along the lines 6—6 of FIGURE 3;

FIGURE 7 is a cross-sectional view, in enlarged form, taken through the detail of FIGURE 6 as would be seen when viewed along the lines 7—7 thereof;

FIGURE 8 is an enlarged cross-sectional view through the fabric feeding apparatus as would be seen when viewed along the lines 8—8 of FIGURE 1;

FIGURE 9 is an enlarged fragmentary sectional view through a portion of the fabric feeding roller structure as would be seen when viewed along the lines 9—9 of FIGURE 2;

FIGURE 10 is a front elevational view of the guide bar structure through which the fabrics to be shirred are passed immediately prior to stitching, the end portions being sectioned away to reveal details of the relative adjustment structure;

FIGURE 11 is an enlarged fragmentary exploded perspective view of the adjusting means for the guide bar structure illustrated in FIGURE 10;

FIGURE 12 is a cross-sectional enlarged view through the guide bar structure of FIGURE 10 as would be seen when viewed along the lines 12—12 thereof;

FIGURE 13 is an elevational view of a portion of the structure illustrated in FIGURE 11 and as would be seen when viewed along the lines 13—13 thereof;

FIGURE 14 is an enlarged fragmentary view of a portion of the apparatus as viewed in the showing of FIGURE 3, with certain details as seen in FIGURE 3 being removed from the showing of FIGURE 14 for purposes of clarity, certain of the moving elements of the apparatus being shown in different positions from those seen in FIGURE 3 and illustrating a different portion of the operating cycle;

FIGURE 15 is an enlarged fragmentary view of a portion of the drive structure which drives and synchronizes the motion of the shirred fabric take-up rollers as would be seen when viewed along the lines 15—15 of FIGURE 14;

FIGURE 16 is an enlarged fragmented sectional view as would be seen when viewed along the lines 16—16 of FIGURE 3, and illustrates in detail the operation of the roller drive for the shirred fabric take-up rolls;

FIGURES 17 and 18 are diagrammatic representations of the produced shirred fabric according to the invention intended to illustrate differences in stitch length in the finished fabric resulting from differences in the speed of production of the fabric as achieved by the fabric take-up roller drive mechanism shown in detail in FIGURES 3, 14 and 16; and FIGURES 19, 20 and 21 illustrate the stepping operation of different elements of the apparatus which result in the production of the shirred fabric.

In these several figures, like elements are denoted by like reference characters.

Consider first FIGURES 1, 2 and 3 which together give a clear picture of the total apparatus and by means of which the interrelationships amongst various parts and the functions performed thereby may be most readily understood. The primary drive for the apparatus is provided by an electric motor 30 which is coupled to a drive shaft 31, extending horizontally from the front to the rear of the apparatus at the right-hand side thereof, through a speed reduction system comprising the belts 32, 33 and 34 trained about the pulleys 35 through 40. The various pulleys are, of course, mounted upon appropriate shafts journalled in bearings suitably secured to the frame of the apparatus, designated generally throughout the drawings as 25, but any suitable equivalent power system for driving the shaft 31 would be equally satisfactory. The shaft 31 has concentrically fixed thereupon a bevel gear 41 which rotates with the shaft 31 and drives a similar bevel gear 42 disposed at right angles to the gear 41. The bevel gear 42 is fixed upon a shaft 43 which extends horizontally across the width of the entire apparatus by means of which the other functioning parts are driven in predetermined relationship to one another. The electric motor 30 is, of course, selectively energizable by means of a suitable switch, not illustrated, which may be located at any convenient point, and a hand-wheel 44 affixed to the shaft 31 is also provided so that the apparatus may be hand driven for purposes of carrying out various mechanical adjustments and checking the various mechanical actions of different portions of the apparatus.

As best seen in FIGURE 1, the shaft 43 extending horizontally across the width of the apparatus terminates at the left-hand side thereof at a bevel gear 45 which in turn drives another bevel gear 46 keyed upon a shaft 47 extending horizontally fore and aft of the apparatus, the shaft 47 being suitably journalled in supports fixed secured to the frame 25 of the machine. Also keyed upon the shaft 43 are a pair of spaced apart slot cams 48, each of which has a continuous contoured cam slot 49 cut into one face, as is best seen in the showings of FIGURES 3 and 14. The slot cams 48 drive the needle bar of the apparatus, and the shaft 47 drives the machine elements which produce the shirring effect, the drawing of the fabrics through the apparatus and the winding of the finished shirred fabric upon storage rolls. Since the shaft 47 and the shaft 43, which latter drives the slot cams 48, are geared together through the bevel gears 45 and 46, it will be apreciated that the motions of the stitching needle bar and the fabric shirring and drawing elements are synchronized with one another and operate cyclically in a predetermined controllable sequence, one complete cycle of machine operation corresponding to one complete revolution of the shaft 43 or the shaft 47, these two shafts being relatively rotatable in unity ratio. The structure of the needle bar actuating mechanism and the stitched fabric drawing mechanism incorporated into the knitting machine will now be briefly described.

As best seen in FIGURE 3, a needle bar 50, to which is secured a plurality of vertically extending needles 51, is vertically reciprocable by means of a pair of vertically extending link bars 52 which reciprocate within the channel guides 53 carried by the frame work 25 of the apparatus. The lower ends of the link bars 52 are pivotally connected at 55 to the forward end of crank shafts 54, which crank shafts extend rearwardly transversely below the shaft 43 to the pivotal securement 56 carried by the rear frame of the apparatus. Extending upward from the crank shafts 54 alongside of the slot cams 48 is a crank shaft lateral projection 57 which carries a pin 58 extending into the slot 49 of the cams 48. As the cams 48 are rotated by the shaft 43, the crank shaft pins 58 follow the contour of the cam slots 49 thus causing the crank shaft 54 to pivot about the rear pivotal support 56 resulting in vertical reciprocation of the link bars 52 through the pivotal connection 55 at the front of the crank shafts. The needles 51 carried by the needle bar 50, therefore, rise and fall in accordance with the contour of the cam slots 49.

As the needles 51 are vertically reciprocated, they stitch together the two plies of fabric 59 and 60 to form the finished shirred fabric 61. In FIGURE 3, it is observed that the finished fabric 61 extends downward from the needle stitching station across the front of the machine, around the backward beneath the drive roller 62, upward between the drive roller 62 and a follower roller 63 and rearward passing between a take-up roller 64 and a below lying driven roller 65, the finished fabric 61 being wound upon the take-up roller 64. The drive roller 62 is fitted with a pulley 66 and the rear driven roller 65 is similarly fitted with a pulley 67, between which pulleys and trained thereabout in "figure 8" fashion is a connecting belt 68. As the drive roller 62 is rotated in a clockwise sense to draw the shirred fabrci 61 downward, the driven roller 65 is rotated in a counterclockwise sense by means of the belt 68 to cause the finished fabric 61 to be wound upon the take-up roller 64. Positive engagement of the shirred fabric 61 with the drive roller 62 is achieved by means of the pivotally hung follower roller 63 spring biased in a forward direction against the fabric 61 to press it into firm engagement with the surface of the drive roller 62.

The operation of the drive roller 62 is best understood by referring to the showings of FIGURES 14, 15 and 16 in addition to the showing of FIGURE 3, and reference should now be made to all of these figures. The drive roller 62 is rotated through a fractional turn once during each complete revolution of the main drive shaft 43 by means of a ratcheted gear arrangement actuated through a linkage system which has its motion determined by a cam secured to and rotatable with the shaft 47. The ratcheted gear system is best illustrated in the showings of FIGURES 3 and 16 wherein it will be observed that a main gear 69 is pinned to the shaft which carries the drive roller 62 and thereby causes the drive roller 62 to rotate in accordance with the displacement of the main gear 69. Secured to the main frame of the machine is a support bracket 70 having a stud 71 projecting therefrom in parallel relationship to the shaft of the drive roller 62. Rotatably mounted upon the stud 71 is a double gear comprising a ratchet gear 72 and a spur gear 73 embraced between the arms of a yoke member 74. Also pivotally secured to the bracket 70 is a pawl 75 so positioned relative to the ratchet gear 72 as to allow the ratchet gear to rotate counterclockwise but to restrain it from clockwise rotation. Pivotally secured to the depending arm of the yoke member 74 is a second pawl 76 biased into engagement with the teeth of the ratchet gear 72 by means of a leaf spring 77. Counterclockwise pivotal motion of the yoke 74 about the stud 71 causes the pawl 76 to drive the ratchet gear 72 in the same counterclockwise sense, but the presence of the pawl 75 mounted to the bracket 70 prevents ratchet gear 72 from counter-rotating in a clockwise sense when the yoke 74 reverses its rotation. Thus, motion of the ratchet gear 72 is always in the counterclockwise direction and constrains the spur gear 73 to move synchronously with it. The teeth of the spur gear 73 are in direct mesh with the teeth of the main gear 69 of the drive roller 62 and the latter is caused to rotate in a clockwise sense whenever the spur gear 73 is driven through the ratchet gear 72 and yoke 74.

The oscillating motion of the yoke 74, which causes the drive roller 62 to be rotated in step-wise fashion, is imparted thereto by a cam driven linkage system including the rearwardly extending link member 78 pivotally secured to the yoke 74 as at 79, and pivotally secured to a substantially vertically extending adjustable length link member 80, as at 81. The adjustable length link member 80 is pivotally secured, as at 82, to the main frame 25 of the machine. A contoured cam 83 is keyed or otherwise secured to the rotating shaft 47 and drives the link member 80 through engagement with a cam follower 84 in contact with the cam surface and rotatably mounted to the link member 80. As the cam 83 rotates with the shaft 47, the cam follower 84 follows the cam contour and causes the link member 80 to pivot about the pivot point 82, in turn causing the link member 78 to shift fore and aft and oscillate the yoke member 74 about the supporting stud 71.

As best seen in FIGURE 3, it will be observed that the yoke 74 moves counterclockwise to drive the roller 62 as the cam follower 84 follows the surface of the cam 83 from the low point to the high point. At the same time, the cam follower pin 58 extending from the crank arm 54 rides in a portion of the cam slot 49 on the cam 48 which is at a constant radius from the shaft 43 so that the needles 51 remain substantially motionless and are in their down position. Thus, as would be expected, the drive roller 62 is actuated to draw downward the finished shirred fabric 61 at the time during which the needles 51 are withdrawn below the fabrics and hence the needles 51 are protected from being snapped off or from tearing through the fabric. It will be further observed from the orientation of the crank arm pin 58 relative to the slots 49 in the cams 48 that the needles 51 are shifted upward and then downward when the pin 58 rides in the cam slots portions of generally straight-line configuration which cut across the face of the cam in chordal fashion. The rise and fall of the needles 51 is seen to coincide with the clockwise rotation of the yoke 74 and the interval of dwell before the yoke 74 again begins to move in a counterclockwise direction for again driving the drive roller 62.

Understanding now how the general apparatus operates to first stitch the fabric and then to draw the stitched fabric downward for winding upon a storage roll, attention will now be directed toward that portion of the apparatus which operates to produce shirring of the top ply 59 of the fabric 61 while maintaining the bottom ply 60 in a planar unshirred flat sheet form. This portion of the apparatus is shown in FIGURES 2, 3, and 6 to 9, and reference should first be made to the showings of FIGURES 2 and 3 for an overall view of the operation, and primarily to FIGURE 3. In FIGURES 3, 6 and 7, it is observed that the shaft 47 extends rearwardly past the point at which it is journalled to the machine frame and has secured thereto for rotation therewith a crank 85. Projecting rearwardly from the face of the crank 85 is a stud 86 radially shiftable relative to the shaft 47 and lockable in a radially selected position by means of the securing nut 87. Rotatably mounted upon the stud 86 is an arm 88 extending upwardly and coupled to a second arm 89 through a shackle connection 90. The under end of the arm 89 is shackle connected, as at 91, to the end of one arm of a V-shaped member 92 which latter is pivotally connected at the root of the V to a support member 93 by means of a pivot 94, the support member 93 being fixedly secured to the frame 25 of the apparatus. Coupled to the end of the remaining arm of the V-shaped member 92 by means of a pivot 95 is a horizontally forward extending link shaft 96 pivotally connected at its forward end, as at 97, to an adjustable length crank arm 98.

The crank arm 98 is pivoted for rotation upon the shaft 99 of a roller 100, the shaft having also affixed thereto for rotation therewith a ratchet wheel 101. Pivotally connected to the crank arm 98 above the ratchet wheel 101 is a pawl 102 the end of which engages the teeth of the ratchet 101 in such manner as to cause clockwise rotation of the roller shaft 99 when the crank arm 98 is oscillated in a clockwise sense by the linkage arrangement coupled thereto. Pivotally secured to the frame 25 of the apparatus below the ratchet wheel 101 is a second pawl 103 whose function is to prevent counterclockwise rotation of the roller shaft 99 when the crank arm 98 is oscillated in a counterclockwise direction by its associated driving linkage system. From the foregoing, it will be appreciated that as the shaft 47 rotates on its axis, the arm 88 pivotally mounted to the crank 85 will drive the shackle connected arm 89 to cause the V-shaped member 92 to pivot in a vertical plane about its horizontal pivotal axis 94. The link shaft 96 will thus be oscillated in a fore and aft direction and cause the crank arm 98 to drive the roller 100 in a stepped clockwise manner through the ratchet wheel 101 and pawl 102. The forward stepping of the roller 100 takes place during the interval when the arm 88, pivotally connected to the crank 85, moves from its downmost to its topmost position, and also the crank arm 98 will oscillate in a counterclockwise direction without moving the roller 100 during the interval in which the arm 88 moves from its topmost to its lowermost position.

As best seen in the showing of FIGURE 9, a roller 104 carried by a shaft 105 extends horizontally below the roller 100, the shaft 105 being rotatably journalled in a fixed position relative to the frame 25 of the apparatus. At the right-hand end of the machine, as seen in FIGURES 2 and 9, each of the roller shafts 99 and 105 has affixed thereto a gear wheel shown respectively as 106 and 107. These gears are seen to be intermeshed with one another so that the roller 104 is counter-rotated relative to the above-lying roller 100 when the latter is stepped by the crank arm 98. As also best seen in FIGURES 8 and 9, it is observed that the roller 100 is journalled in floating bearings 108, only one of which is shown, spring biased in a downward direction so as to firmly press the upper ply of fabric 59 between the rollers 100 and 104 to impart a positive drive to the fabric when the roller 100 is stepped. The floating action of the bearings 108 is obtained through the vertically extending pins 109 threaded into the top of the bearings 108 and extending upward through aperture plates 110 secured to the top of the rollers supporting structures 111 at opposite ends of the roller, the structures 111 being fixedly secured to the frame 25 of the apparatus. The downward bias is imparted to the floating bearings 108 by compression springs 112 disposed about the pins 109 and having opposite ends in bearing engagement with the underside of the apertured plates 110 and the tops of the floating bearings 108.

Pivotally secured to the tops of the pins 109 as by the pivots 113 for rotation about a horizontal axis are the cams 14. The cams 114 are of the eccentric type so that, as viewed for example in FIGURE 8, rotation of the cams in a counterclockwise sense about pivots 113 causes the compression springs 112 to be compressed and the bearings carrying pins 109 to be shifted upward to thereby disengage the roller 100 from its clamping engagement with its underlying roller 104 and thereby releasing the fabric 59. This ability to disengage the rollers 100 and 104 is necessary so that when the apparatus is being set up, the fabric 59 may be fed between these rollers in a free manner and easily drawn and positioned relative to the lower ply 60, the needles 51, and the fabric drawing apparatus previously described in connection with the fabric drawing roller 62. As best seen in FIGURES 2, 3 and 8, the upper ply fabric 59 is looped around and between a plurality of rollers 115 through 120, extending backward and up to a supply roll 121 supported by brackets 122 from the frame 25 of the apparatus. The bottom ply fabric 60 is similarly passed around a plurality of rollers 123 through 127 and extends rearwardly to its own supply roll 128, also supported by brackets 129 from the frame 25 of the apparatus.

A lateral adjustment mechanism for the supply roll 121 is shown in FIGURE 3 and in the enlarged fragmentary views of FIGURES 4 and 5, and provides the means of shifting the roll 121 horizontally to properly align the top and bottom fabric plies 59 and 60 for aligned passage through the rollers, resulting in proper indexing of the fabric plies with one another at the point where they are stitched by the needles 51. As best seen in FIGURE 4, the shaft 130 which carries the supply roll 121 is formed with an enlarged end 131 having a slot therein to receive the slotted end 132 of a shift link 133. The opposite end of the shift link is carried upon a screw-advance mechanism including a threaded shaft 134 carried by a bracket 135 and rotatable by a handle 136. Rotation of the handle 136 causes the link 133 to be shifted left or right upon the threaded shaft 134 as a function of the direction of rotation of the handle 136, and hence causes the roll 121 carried upon the shaft 130 to be similarly shifted to provide the proper positioning.

As shown most clearly in FIGURE 8, and in diagramatic form in FIGURES 2, 3 and 14, both plies of the fabric 59 and 60 are passed through a guide bar structure after merging from their associated roller systems and are brought together one upon the other immediately above the needles 51 so that they may be stitched together and then drawn downward from the stitching station, as previously described, for winding upon the storage roll in the form of a finished shirred fabric. The lower ply fabric 60 is drawn upward and horizontally forward around the curved edge of a guide bar 137 and immediately below a vertically shiftable angle bar 138. Detail views of the fabric guiding structure are illustrated in FIGURES 10 to 13, to which reference should now also be made. As shown therein, the angle bar 138 is supported at opposite ends by a pair of upturned ears 139 having formed therein a pair of threaded holes 140 and 141. The ears 139 are vertically shiftable within keyways 142 formed on the inside faces of a pair of angle brackets 143 each of which is appropriately secured to the frame 25 of the apparatus. The angle brackets 143 are vertically slotted as at 144 with the slots in registry with the threaded holes 140 and 141 so that a threaded stud 145 may be passed through the angle bracket slots 144 and threaded into the holes 140, whereby the angle bar 138 may be locked in a desired vertically adjusted position relative to the underlying guide bar 137 by tightening down of the threaded studs 145.

Positioned vertically above the angle bar 138 and adjustable relative thereto is an overlying horizontally extending upper guide bar 146 having affixed to opposite ends thereof a pair of angle members 147, each of which is formed with a vertically extending channel 148 centrally slotted as at 149. The vertical channel 148 in the angle members 147 is of a sufficient width to embrace the sides of the upturned ears 139 which support the angle bar 138, and the slot 149 in these same angle members 147 also registers with the threaded holes 140 and 141 so that a threaded stud 150 may be passed through the slot 149 and into the threaded holes 141 in order that the upper guide bar 146 may be clamped in a desired vertically adjusted position relative to the underlying angle bar 138 by tightening down upon the studs 150. From the foregoing, it will be clear that the angle bar 138 is adjustable relative to the underlying guide bar 137 to provide a controlled spacing therebetween, and in similar manner the upper guide bar 146 is vertically adjustable relative to the angle bar 138 to provide a desired vertical clearance therebetween.

The purpose of the lower guide bar 137, angle bar 138 and upper guide bar 146 is the provision of means for insuring that both plies of the fabric, 59 and 60, pass above the needles 51 in a flattened out smooth form, with the exception, of course, that the upper ply 59 may appropriately pucker so that the shirring may be achieved. Thus, the clearance between the guide bar 137 and the angle bar 138 is sufficient so that the lower ply 60 may be drawn therethrough fairly freely. The vertical clearance between the angle bar 138 and the above lying upper guide bar 146 is sufficient so that while a guiding function for the upper ply of fabric 59 is maintained, nevertheless the fabric 59 may pass freely and without restraint therethrough. Obviously, any sort of clamping pressure effecting a restraint upon the free passage of the fabric 59 between the angle bar 138 and upper guide bar 146 would prevent the puckering effect from occuring and hence would preclude the possibility of shirring the upper ply of fabric.

Proper tension on the lower ply of fabric 60 is achieved through the use of the rollers 123 through 127, and similarly the tension on the upper ply of fabric 59, before it enters between the rollers 100 and 104, is accomplished by means of the rollers 115 through 120. If desired, the tension on the fabric 59, for example, could be reduced by removing some of the rollers from the tensioning system, as for example by removing either the roller 118 or 120. As best seen in FIGURES 2 and 3, the rollers 118, 119 and 120 are removably seated for rotation in a plurality of slots 151 of a roller rack 152, and more or less rollers may be placed into the rack or removed therefrom as a function of the tensioning which it is desired to create in the upper ply of fabric 59. Although not so shown, the exact same sort of tensioning system may also be employed for the lower ply of fabric 60, or in the alternative, the illustrated type of tensioning system may be used and the desired tension obtained by utilizing more or less of the rollers 123 through 127.

The shirring action may be most clearly understood by referring to the diagrammatic simplified representations of FIGURES 19, 20 and 21. FIGURE 20 corresponds to the conditions illustrated in FIGURE 14, and FIGURE 21 corresponds to the apparatus conditions illustrated in FIGURE 3. In order to better observe the stepping action of the shirring roller 100 and the finished fabric drawing roller 62, index marks 153 and 154 respectively have been placed upon these rollers 100 and 62 in the showings of FIGURES 19 through 21. Considering FIGURE 19 as a starting point, the index mark 153 on the roller 100 is observed to be at a clockface position corresponding to twelve o'clock. The conditions obtaining at this time shall be considered to be that of a line of stitching has already been made by the needles 51 across the fabric and the draw down roller 62 has been actuated to pull down the fabric just stitched, so that the roller 100 is now ready to be stepped by the crank arm 98 and its associated driving linkage system. The transition from the conditions of FIGURE 19 to those of FIGURE 20 involves two steps wherein firstly the roller 100 is observed to have been stepped clockwise approximately ninety degrees so that a length of the fabric 59 has been pushed forward between the angle bar 138 and the upper guide bar 146 and caused to loop out beyond the stitching position of the needles 51. Thereafter, the cam 48 has rotated into position so that the pin 58 of the crank arm 54 has been constrained to move from the circular path of constant radius inward toward the shaft 43 along the straight line portion of the cam slot 49 and has thus caused the needles 51 to rise and pierce both plies of the fabrics 59 and 60 to tie the looped upper ply 59 to the lower ply 60 in the shirred fabric. During this portion of the cycle, the drive roller 62 has remained motionless as indicated by the index mark 154 observed to be in the twelve o'clock position.

The conditions of FIGURE 20 are converted to those illustrated in FIGURE 21 by means of two additional steps in the cycle. First, it will be observed that the shirring roller 100 occupies the same position in the showing of FIGURE 21 as that seen in FIGURE 20 so that it will be understood that the shirring roller 100 has been motionless during this time. The cam 48, however, will be observed to have rotated through approximately one-half turn so that the pin 58 of the crank arm 54 now rides in the slot portion of constant radius. Thus, the needles 51 have been shifted downward below the now stitched fabric. The foregoing having taken place, the draw-down drive roller 62 has stepped clockwise and shifted the just stitched portion of the shirred fabric to the right and started it on its downward descent. The cycle now repeats as long as the machine is in operation with the steps occurring cyclically in the order of, stepping of the shirring roller 100, raising and lowering of the needles 51 to stitch the fabric, and drawing down of the stitched fabric.

The manner in which the depth of the shirring and/or the length of the stitch made by the needles 51 may be adjusted will best be understood by turning to the showing of FIGURE 3. The depth of shirring may be controlled in two ways, both of which control the degree of stepping to which the shirring roller 100 is subjected through the driving linkage mechanism. As illustrated, the pivot 97 which connects the link shaft 96 to the crank arm 98 is located at an intermediate position along the length of the crank arm 98. The stroke of the link shaft 96 thus causes a certain amount of angular rotation of the shirring roller 100 each time that it shifts forward. The showing of FIGURE 3 illustrates a maximum rotation condition and may be altered to provide a lesser degree of rotation by reconnecting the pivot 97 at one of the outer two pivot holes 155 to thereby decrease the effective stroke length of the link shaft 96 as related to the ratchet wheel 101 keyed onto the roller shaft 99. Further, the stroke length of the link shaft 96 may be reduced by shifting the stud 86 secured to the crank 85 in a radially inward direction toward the axis of the driving shaft 47. By means of these foregoing possible adjustments, a relatively wide range of shirring depth for the upepr ply of fabric 59 is possible.

The length of stitch is readily adjustable by exercising control over the degree of angular oscillation through which the yoke member 74 passes during a given cycle. A decrease of the oscillation angle may be carried out by moving the pivot 79 downward through the slot 156 in the yoke arm 74, and alternatively or additionally, shortening the effective length of the adjustable link 80 by loosening the fastener 157 and retightening the same after slipping the two parts of the link 80 inward toward one another. Conversely, the length of stitch may be increased by moving the pivot 79 upward in the slot 156 or by lengthening the effective length of the adjustable link 80. It is, of course, understood that substantial lengthening of the stitch will cause a decrease in the depth of shirring and must be accommodated for by increasing the angle through which the shirring roller 100 is stepped. By way of illustration, FIGURES 17 and 18 show fragments of shirred fabrics which have been produced with different stitch lengths, FIGURE 17 showing approximately nine stitches within the same interval which in FIGURE 18 shows approximately six stitches, the stitches being depicted in FIGURES 17 and 18 respectively as the dashed lines 158 and 159. Also of interest in FIGURES 17 and 18 is the fact that the central regions designated respectively as 160 and 161 illustrate the top ply of the shirred fabric as being unshirred in this region, a result achieved by merely removing certain ones of the needles 51 from the needle bar 50 so that no stitching can occur in these particular regions. In this manner, that is by selectively removing needles from the apparatus, various patterns of shirred and unshirred areas in the composite shirred fabric may be achieved.

Having now described my invention in connection with a particularly illustrated embodiment of the apparatus for producing a shirred fabric and one possible shirring pattern, it will be apparent that variations and modifications may now readily occur to those persons normally skilled in the art without departing from the essential spirit or scope of the invention, and accordingly, it is intended to claim the same broadly as well as specifically as indicated by the appended claims.

What is claimed as new and useful is:

1. An apparatus for producing a shirred material from two plies of fabric wherein one ply of fabric of the finished material is in flat form and the other ply is shirred and stitched thereto, comprising in combination, first and second fabric supplies for providing respectively a top ply of fabric to be shirred and a backing ply of fabric to be stitched to the shirred top ply while itself being maintained in flat form, a stitching station including stitching means for stitching together the two plies of fabric, drawing means for drawing the two plies of fabric through the stitching station in superposed relation to one another, shirring means for looping the top ply of fabric through the stitching station beyond the stitching means so that the subsequently made stitch permanently ties the loop to the flat backing ply, said shirring means comprising a pair of revoluble parallel rollers biased toward one another to firmly press the top ply of fabric therebetween and stepping means for stepping said shirring rollers through a predetermined angle of revolution once during each cycle of operation, said shirring rollers when stepped causing said top ply fabric to loop through the stitching station as aforesaid, and power means and synchronizing means for actuating all of said shirring means, said stitching means and said drawing means in timed relationship to one another to provide repetitive cycles of operation following the sequence of shirring the top ply, stitching the two plies together and then drawing the stitched plies beyond the stitching means.

2. The apparatus according to claim 1 wherein said shirring rollers stepping means comprises a unidirectionally rotatable ratchet wheel secured to and revoluble with one of said pair of shirring rollers, and oscillatable linkage means coupling said shirring rollers ratchet wheel to said synchronizing means and power means and driven by the latter, said shirring rollers ratchet wheel being stepped by said linkage means during a portion of the oscillation cycle of the linkage means.

3. The apparatus according to claim 2 wherein said linkage means includes means for adjusting the throw of the linkage to thereby control the stepping angle through which said shirring rollers ratchet wheel and roller are revolved.

4. The apparatus according to claim 2 further including guiding means for guiding the backing ply to the stitching station in smooth flattened out form, said guiding means comprising three spaced-apart parallel extending bars, the intermediate and upper bars including adjustment means for adjusting the spacing therebetween and for adjusting the spacing between the intermediate and lower bars, said backing fabric ply passing between the lower and intermediate bars while the shirring fabric ply passes between the intermediate and upper bars immediately before entering the stitching station, said adjustment means being adjusted to set the interbars spacings so that both fabric plies may pass between their associated guide bars without restraint while at the same time being maintained in flat unfolded form, and said shirring means when actuated causing said shirring fabric ply to loop after passing between the intermediate and upper guide bars.

5. The apparatus according to claim 4 wherein said drawing means comprises a pair of revoluble parallel rollers biased toward one another to firmly press the shirred material therebetween, and stepping means for stepping said drawing rollers through a predetermined angle of revolution once during each cycle of operation, said drawing rollers when stepped causing a predetermined amount of both plies of fabric to be drawn through the stitching station as aforesaid, said drawing rollers stepping means comprising a unidirectionally rotatable ratchet wheel secured to and revoluble with one of said pair of drawing rollers, and oscillatable linkage means coupling said drawing rollers ratchet wheel to said synchronizing means and power means and driven by the latter, said drawing rollers ratchet wheel being stepped by said linkage means during a portion of the oscillation cycle of the linkage means.

References Cited in the file of this patent

UNITED STATES PATENTS

| | | |
|---|---|---|
| 2,231,648 | Weis | Feb. 11, 1941 |
| 2,253,077 | Kierner | Aug. 19, 1941 |
| 2,335,838 | Ackerman | Nov. 30, 1943 |
| 2,632,495 | Agee | Mar. 24, 1953 |
| 2,681,019 | Liebowitz | June 15, 1954 |
| 2,881,724 | Cremer et al. | Apr. 14, 1959 |
| 2,893,336 | Chinnici | July 7, 1959 |
| 2,935,958 | Kuhn | May 10, 1960 |